April 19, 1927.

M. W. WALKER

BABY SPOON

Filed Feb. 2, 1926

1,625,003

INVENTOR
Margaret W. Walker
by W. E. Doolittle
attorney.

Patented Apr. 19, 1927.

1,625,003

UNITED STATES PATENT OFFICE.

MARGARET W. WALKER, OF WYNCOTE, PENNSYLVANIA.

BABY SPOON.

Application filed February 2, 1926. Serial No. 85,607.

This invention relates to a spoon or similar utensil for infants.

The invention has for its principal object to provide a spoon or other utensil for the use of infants just beginning to feed themselves, having an improved handle which the baby may grasp in a firm but convenient and natural manner, whereby it may manipulate the spoon more easily and gracefully than is possible with the usual type of spoon provided for this purpose.

The invention may be readily understood by reference to the accompanying drawings, in which.

Figure 1:
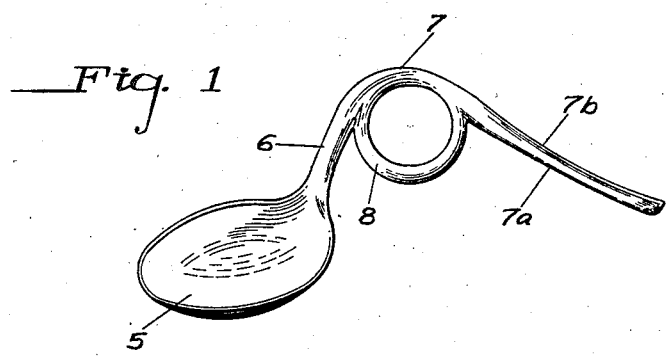
Figure 1 is a perspective view of a spoon embodying my invention.
Figure 2:
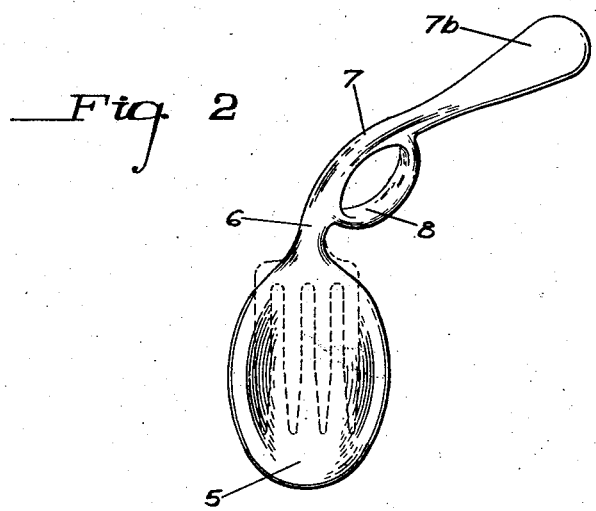
Figure 2 is a top view of the spoon.

While I described my invention with particular reference to a spoon, it will be understood that the invention is not confined to use with a spoon, but may be embodied in any other suitable utensil, such for instance as a fork, as indicated in dotted lines in Fig. 2.

In the drawings, 5 designates the bowl of a spoon from the rear end of which projects a vertically extending handle portion 6, which is sloped or inclined rearwardly to a slight extent and the top of which is inclined or curved laterally a slight distance from the vertical. At 7 the handle is curved quite sharply to one side so that its longitudinal axis forms quite an angle with the longitudinal axis of the bowl of the spoon. The handle is also bent downwardly at 7 so that the highest point in the handle is at the bend.

Figure 3:
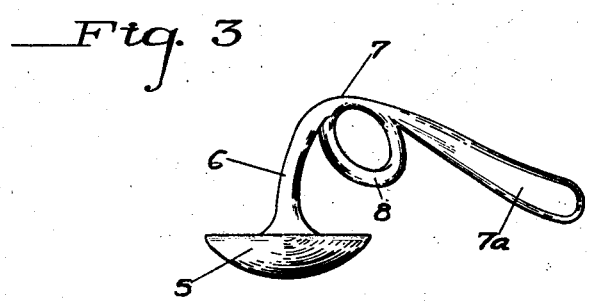
Figure 3 is an end view of the spoon looking directly at the front of the bowl.

The handle beyond point 7 begins to gradually increase in width, and is transversely sloping when the bowl is level, sloping downwardly away from the bowl, as shown in Fig. 3, where 7ª designates the under surface of the handle, 7ᵇ being used to designate the top surface.

Integrally formed in the handle at point 7 is a ring 8, which is inclined rearwardly at about the same angle as portion 6 of the handle.

As thus formed, the handle of the spoon has a peculiar shape which lends itself readily to the infant's hand. The spoon may be grasped with the index finger inserted through the ring with the other fingers closed about the handle. When so held, the transversely inclined handle fits the palm while its longitudinal inclination lends itself to the natural angle at which the palm lies relatively to the horizontal when the fingers are so held.

The ring in the handle at the position described is in a place most convenient and natural, and enables the child to securely hold the spoon and keep it from turning.

I claim as my invention:—

1. A spoon having a bowl, a handle at the rear of the bowl, the handle at the point of attachment extending upward and sloping rearwardly, said handle being curved at the top of the sloping part and intermediate its overall length to one side, forming an angle with the longitudinal axis of the bowl, and a ring formed in the handle at the curve.

2. A spoon having a bowl, a handle at the rear of the bowl, the handle at the point of attachment extending upward and sloping rearwardly, said handle being curved at the top of the sloping part and intermediate its overall length to one side, forming an angle with the longitudinal axis of the bowl, and a ring formed in the handle at the curve, the laterally extending part of the handle also sloping downwardly toward its free end.

3. A spoon having a bowl, a handle at the rear of the bowl, the handle at the point of attachment extending upward and sloping rearwardly, said handle being curved at the top of the sloping part and intermediate its overall length to one side, forming an angle with the longitudinal axis of the bowl, and a ring formed in the handle at the curve, the laterally extending part of the handle being widened out and sloping downwardly from said curve toward its free end, the handle also being transversely inclined with the edge toward the bowl higher than the other edge.

In testimony whereof I affix my signature.

MARGARET W. WALKER.